United States Patent [19]

Eriksson et al.

[11] Patent Number: 5,537,097
[45] Date of Patent: Jul. 16, 1996

[54] METHOD FOR TRANSFERRING MESSAGES IN A ONE-WAY COMMUNICATION SYSTEM

[75] Inventors: Goran Eriksson; Thomas Beijer; Göran Edbom, all of Haninge, Sweden

[73] Assignee: Televerket, Farsta, Sweden

[21] Appl. No.: 370,355

[22] Filed: Jan. 9, 1995

Related U.S. Application Data

[63] Continuation of Ser. No. 768,596, Nov. 18, 1991, abandoned, filed as PCT/SE91/00047, Jan. 23, 1991.

[30] Foreign Application Priority Data

Feb. 2, 1990 [SE] Sweden ................................ 9000376

[51] Int. Cl.$^6$ ...................................................... H01H 67/00
[52] U.S. Cl. ............................. 340/825.02; 340/825.44; 455/38.3
[58] Field of Search ....................... 340/825.44, 825.02, 340/825.03; 455/38.1, 38.3

[56] References Cited

U.S. PATENT DOCUMENTS

| 4,518,961 | 5/1985 | Davis et al. | 340/825.44 |
| 4,713,808 | 12/1987 | Gaskill et al. | 370/94 |
| 4,860,003 | 8/1989 | DeLuca et al. | 340/825.44 |
| 5,150,361 | 9/1992 | Wieczorek et al. | 340/825.44 |
| 5,187,470 | 2/1993 | King et al. | 340/825.44 |
| 5,189,413 | 2/1993 | Gaskill et al. | 340/825.44 |
| 5,196,842 | 3/1993 | Gomez et al. | 340/825.44 |
| 5,266,945 | 11/1993 | Peek et al. | 340/825.44 |

FOREIGN PATENT DOCUMENTS

| 2072908 | 10/1981 | United Kingdom. | |
| 2110850 | 6/1983 | United Kingdom. | |
| WO90/15512 | 12/1990 | WIPO | 340/825.44 |
| WO91/03037 | 3/1991 | WIPO | 340/825.44 |

Primary Examiner—Brent A. Swarthout
Assistant Examiner—Andrew Hill
Attorney, Agent, or Firm—Oblon, Spivak, McClelland, Maier & Neustadt

[57] ABSTRACT

The invention relates to a method for transferring messages in a one-way communication system, particularly a paging system. The transmission of the messages is organized in such a manner that the message is separated from the address. By address it is meant the identity codes of the receivers. Furthermore, the receivers find their message with the aid of a subaddress. The method provides for battery saving by means of the fact that the receivers which are not addressed in the address part do not listen to the message part but go into a battery-saving idle mode.

6 Claims, 4 Drawing Sheets

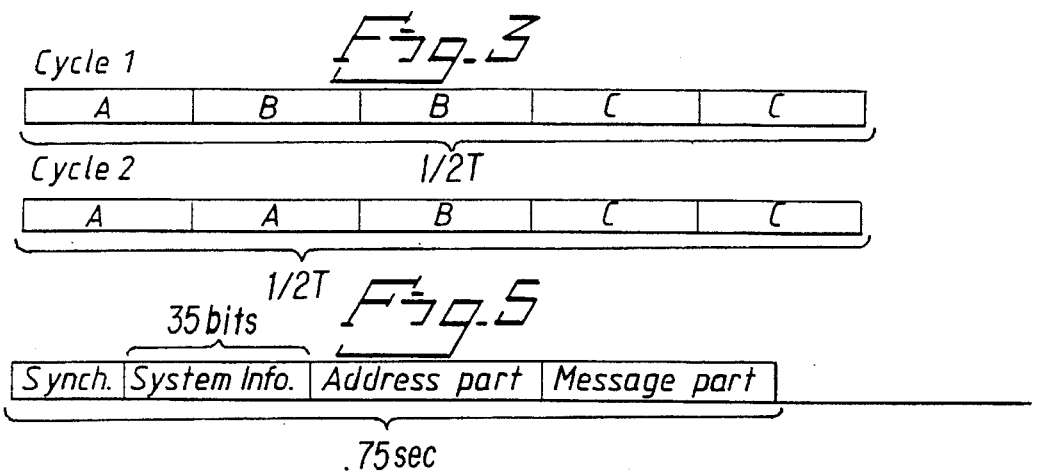
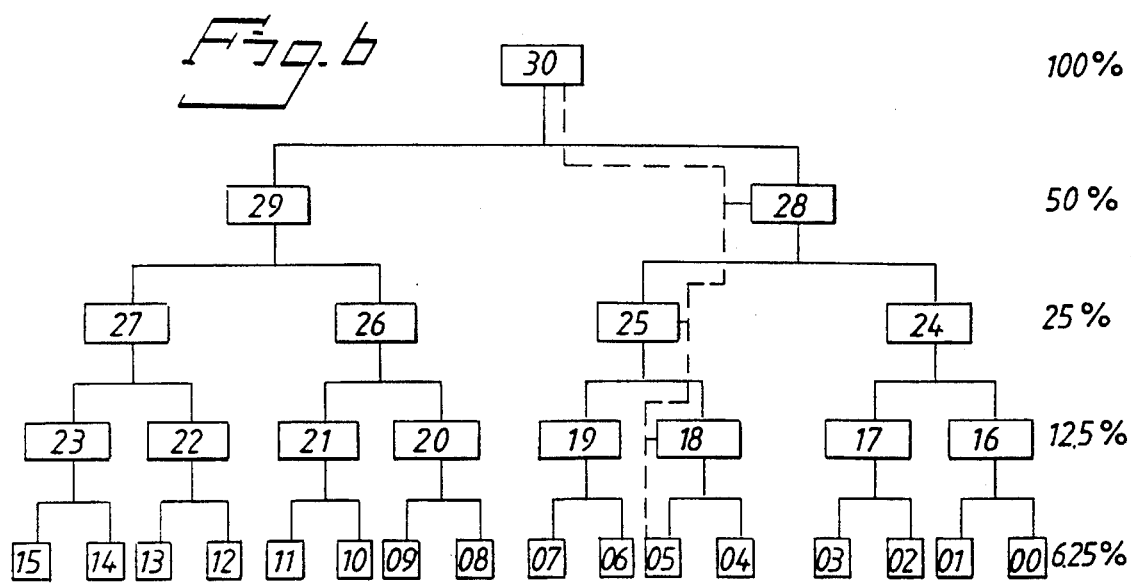
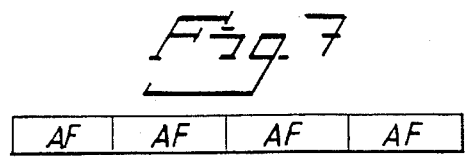
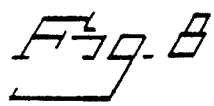

Fig. 4

| Record no. | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| Channel | | | | | | | | | | | | | | | | |
| 01 | A | B | C | D | E | F | G | H | I | J | K | L | M | N | O | P |
| 02 | P | A | B | C | D | E | F | G | H | I | J | K | L | M | N | O |
| 03 | O | P | A | B | C | D | E | F | G | H | I | J | K | L | M | N |
| 04 | N | O | P | A | B | C | D | E | F | G | H | I | J | K | L | M |
| 05 | M | N | O | P | A | B | C | D | E | F | G | H | I | J | K | L |
| 06 | L | M | N | O | P | A | B | C | D | E | F | G | H | I | J | K |
| 07 | K | L | M | N | O | P | A | B | C | D | E | F | G | H | I | J |
| 08 | J | K | L | M | N | O | P | A | B | C | D | E | F | G | H | I |
| 09 | I | J | K | L | M | N | O | P | A | B | C | D | E | F | G | H |
| 10 | H | I | J | K | L | M | N | O | P | A | B | C | D | E | F | G |
| 11 | G | H | I | J | K | L | M | N | O | P | A | B | C | D | E | F |
| 12 | F | G | H | I | J | K | L | M | N | O | P | A | B | C | D | E |
| 13 | E | F | G | H | I | J | K | L | M | N | O | P | A | B | C | D |
| 14 | D | E | F | G | H | I | J | K | L | M | N | O | P | A | B | C |
| 15 | C | D | E | F | G | H | I | J | K | L | M | N | O | P | A | B |
| 16 | B | C | D | E | F | G | H | I | J | K | L | M | N | O | P | A |

Fig. 9

| External | Serial Number | Tone | ASB | Subaddress |
|---|---|---|---|---|
| (1) | (17) | (1) | (1) | (6) |

Fig. 10

| Flag start/stop | Subaddress | Network identifier |
|---|---|---|
| (8) | (6) | (13) |

←— — — Internal— — — — →
←— — —External— — — — — — — — — →

| Protocol bits | Message number | Repetition | Forwarding | Urgent | Link |
|---|---|---|---|---|---|
| (3) | (5) | (1) | (1) | (1) | (1) |

Fig. 11

Internal call:

| External | Serial No. | Tone | Alarm | Rep. | Urgent | ASB |
|---|---|---|---|---|---|---|
| (1) | (17) | (1) | (3) | (1) | (1) | (1) |

External call:
Address field:

| External | Serial No. | Tone | ASB | Subaddress |
|---|---|---|---|---|
| (1) | (17) | (1) | (1) | (6) |

Message field:

| Flag start/stop | Subaddress | Network identifier | Alarm |
|---|---|---|---|
| (8) | (6) | (13) | (3) |

Fig. 12

| Flag start/stop | Subaddress | Network identifier |
|---|---|---|
| (8) | (6) | (13) |

←— — — Internal— — — →
←— — —External— — — — — — — — →

| Protocol bits | Message No | Rep. | Forwarding | Urgent |
|---|---|---|---|---|
| (3) | (5) | (1) | (1) | (1) |

Fig. 13

| Section with protocol bits = 100 | New radio identicode B | B | B |
|---|---|---|---|

B = The new radio identity code

5,537,097

METHOD FOR TRANSFERRING MESSAGES IN A ONE-WAY COMMUNICATION SYSTEM

This application is a continuation of application Ser. No. 07/768,596, filed on Nov. 18, 1991, now abandoned which was filed as PCT application PCT/SE91/00047 on Jan. 23, 1991.

BACKGROUND OF THE INVENTION

The present invention relates to a method for transferring messages in a one-way communication system. To be precise, the invention is intended for application in a paging system.

In prior art paging systems, the address and message have been transmitted in one and the same block. According to the invention, addressing and message transmissions are separate from each other. This provides significant battery savings and a higher degree of utilisation of the radio channels.

The object of the invention is achieved by means of a method for transferring messages in a one-way communication system in accordance with the following system.

BRIEF DESCRIPTION OF THE DRAWINGS

The invention will now be described in detail with respect to the following drawings, in which:

FIG. 3 shows sharing examples of time division in the network;

FIG. 4 shows the synchronisation between the channels and the search procedure;

FIG. 5 shows a record structure;

FIG. 6 shows the grouping of frequency subsets;

FIG. 7 shows the address part;

FIG. 8 shows the structure of the radio identity code;

FIG. 9 shows the format of the address field;

FIG. 10 shows the section of the message field;

FIG. 11 shows the handling of tone-only calling;

FIG. 12 shows the transmission of the last message number;

FIG. 13 shows the remote programming of radio identity codes.

DETAILED DESCRIPTION OF A PREFERRED EMBODIMENT OF THE INVENTION

According to the present invention, a method is provided for transferring messages in a one-way communication system, particularly in a paging system.

According to the invention, a message is separated from an address. By an address it is meant the identity code(s) of the receivers. The receivers find their message with the aid of a subaddress. The subaddress can be a pointer, queue number and a field for error detection can be attached to it. In another variant of the invention, the same identity code can be used as a subaddress which means that the identity code of the receiver is repeated just before the message.

Figure 1:
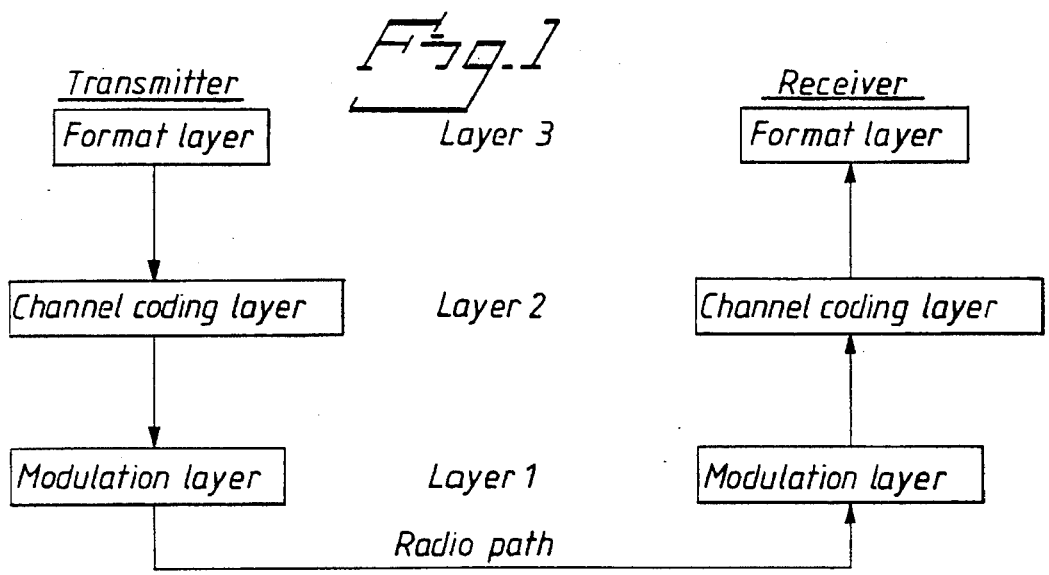
FIG. 1 diagrammatically shows the format in three layers according to the invention.

As shown in FIG. 1, the radio subsystem is divided into three layers: the modulation layer 1, the channel coding layer 2 and the format layer 3. Each layer has a certain function. Layer n-1 is served by layer n. Each layer is independent of the others, for example the structure of the format layer is independent of the channel coding layer.

The function of the modulation layer is to divide the coded and formatted bits from a transmitter to all receivers. Any differentiation will be carried out in this layer. Interleaving also belongs to this layer.

The channel coding layer has the task of carrying out error detection and correction. The channel coding layer uses layer 1 for the actual receiving/transmitting of the bits. This can be quite independent of the format layer. The length of the code word used for the channel coding is independent of the format.

The format layer supplies the :Following functions: addressing, synchronisation of the receivers in the system, battery saving and the paging field and support for the services in the system.

Figure 2:
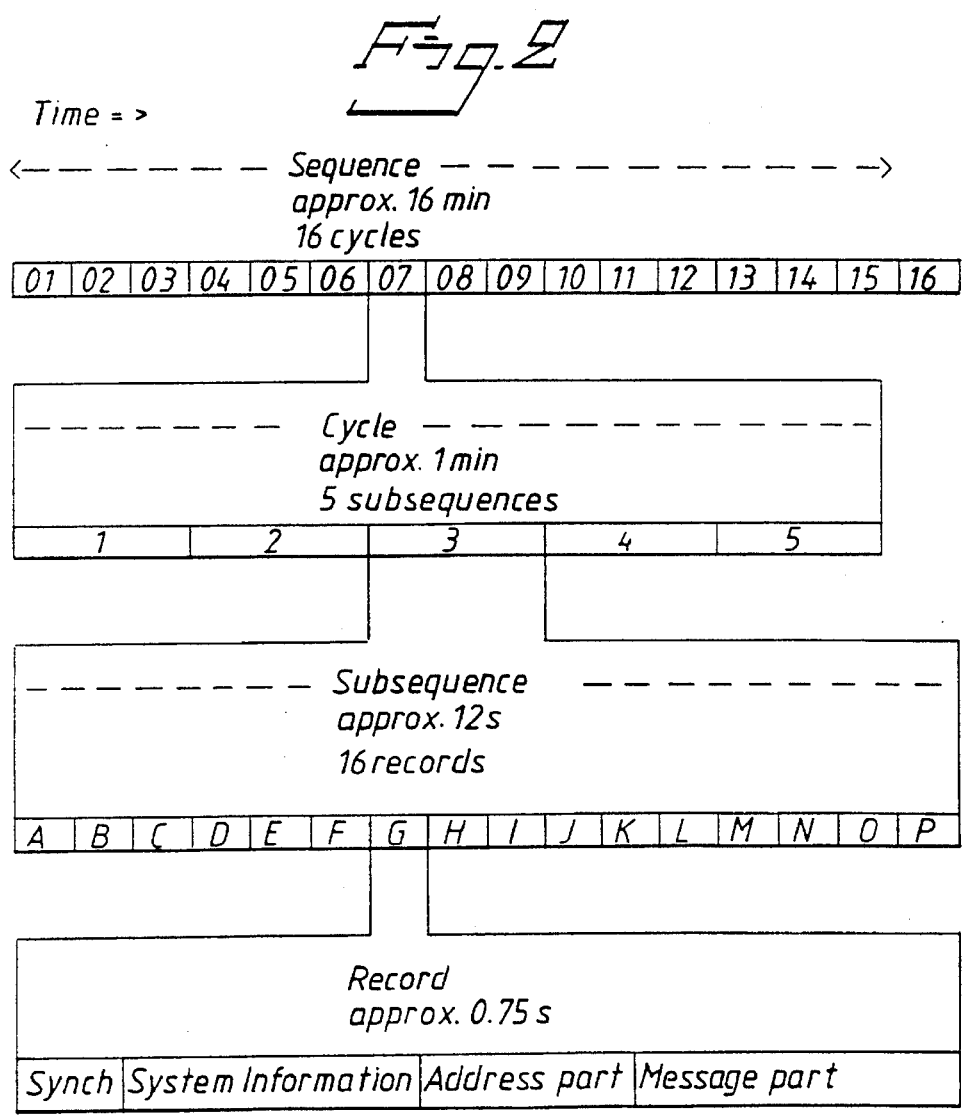
FIG. 2 shows the hierarchical structure of the format layer.

FIG. 2 shows the structure of the format. This structure consists of four levels, the tasks of which are described below.

The uppermost level is the sequence level which consists of 16 cycles. The sequence level of the format is only used for battery saving. Pagers with very low power consumption are allocated one of the 16 cycles in which they are in an active state. Normal pagers are active in each of the 16 cycles.

The next level is the cycle level which consists of five subsequences. In a time-divided network, the subsequences are distributed between paging areas so that adjoining paging areas never transmit at the same time.

A subsequence is divided into 16 records. The division has two aims: pagers occupied in the home network use these records for battery saving and pagers occupied outside their home network use these record division for searching through all channels.

The last level is the record level which consists of a synchronisation part, a system information part, an address part and a message part.

The network according to the invention can operate as a time-sharing network. This implies that adjoining paging areas share the same frequency and that different time gaps are allocated to these paging areas. The time-sharing occurs at the cycle level so that the subsequences are distributed among the paging areas.

One cycle consists of five subsequences. In each cycle, the paging areas affected must be allowed to transmit at least one subsequence. The division of the subsequences between paging areas is not necessarily the same in all cycles. This floating arrangement allows an adaptation of the available transmission times to the traffic offered. An example of this is shown in FIG. 3 where the total traffic offered is T, where 0.3 T, 0.3 T and 0.4 T, respectively, are allocated to paging areas A, B, C through the two cycles. That is to say 3 pages to area A occur, 3 to area B and 4 to area C out of the "two" full cycles.

A subsequence consists of 16 records, A–P. Each receiver belongs to only one record in which it is in the active state. In the other records, the receiver is in an idle mode. The record to which the receiver belongs is defined by the four least significant bits of a radio identity code.

| Record | Least significant bits |
|--------|------------------------|
| A | 0000 |
| B | 0001 |

-continued

| Record | Least significant bits |
|---|---|
| C | 0010 |
| D | 0011 |
| E | 0100 |
| F | 0101 |
| G | 0110 |
| H | 0111 |
| I | 1000 |
| J | 1001 |
| K | 1010 |
| L | 1011 |
| M | 1100 |
| N | 1101 |
| O | 1110 |

The receiver normally listens to its home channel. The home channel of a receiver is the channel marked with the identity code for the network in which the receiver is registered. If the receiver is locked to its home channel, it only listens on the record allocated. In this state, the receiver listens to one record per subsequence. During the other records, the receiver is in idle mode thereby saving power.

If the receiver cannot detect its home channel, it searches among all the channels in the manner and sequence shown in FIG. 4.

FIG. 5 shows a record structure. The length of time for one record is 0.75 seconds. One record is divided into four parts: synchronisation part, system information part, address part and message part. Receivers which are not addressed in the address part will not be listening to the message part. During the message part, these receivers are in idle mode.

The synchronisation part consists of a bit synchronisation word and a format synchronisation word. The bit synchronisation word helps the pager to produce bit synchronisation. The receiver is synchronised to the format of the synchronisation word.

| Bit synchronisation word: | Undefined |
|---|---|
| Format synchronisation word: | Undefined |
| The system information part consists of: | |
| Network identity | 13 bits |
| Paging area indicator | 6 bits, which is enough for 64 paging areas per network |
| Frequency subset indicator | 5 bits (see below) |
| Record, subsequence and cycle number | 11 bits total |

The system information part thus has a total length of 35 bits.

The frequency subset indicator allows the network operator to adapt the number of frequencies to the current traffic, that is to say the operator can use all his channels in high traffic and only a part of them in low traffic. The frequency subset indicator refers the receivers to frequencies on which they can wait for their call. All receivers carry a two-digit frequency subset number which is permanently stored in the receiver. Each frequency subset number corresponds to a unique combination of five two-digit numbers.

FIG. 6 shows the structure for allocating and decoding frequency subsets at the receiver level. If a frequency subset number is, for example, 05, the corresponding numbers are 05, 18, 25, 28, 30. The receivers will lock to the channel whose frequency subset indicator matches any of the numbers which are linked to its frequency-sharing number. A pager with frequency subset number 05 searches for channels with the frequency subset indicator which has the values 05, 18, 25, 28 or 30 and locks to the channel. With high traffic, several channels will be used and the receiver will find a channel which transmits with a frequency subset indicator equal to 0.5. With low traffic, some of the channels can be taken out of service and the receiver will then find a channel which, for example, has the frequency subset indicator=25. This channel will then also carry traffic to the receivers which would belong to groups 07, 06 and 04 as well as group 05.

All pagers which receive a message in one record are addressed in the address part.

Tone-only calls are transmitted completely in the address part. All other types of paging call (numeric, alphanumeric and transparent data calls) use both the address part and the message part. Where the identity code of the receiver is used as subaddress, tone-only calls must also use the message part.

As can be seen from FIG. 7, the address part consists of a number of address fields AF, each one of which relates to only one call.

In FIG. 8, the structure of the radio identity code is shown, which is the number which is used by the system on the radio path for identifying the receiver (receivers) to which the paging relates. The radio identity code consists of a network identifier and a serial number.

The country identifier follows the numbering plan defined in CCITT recommendation E. 212. The network number permits eight networks per country. The serial number consists of 21 bits which provide each network with an addressing capacity of 2097152 radio identity codes.

Only the 17 most significant bits of the serial number are transmitted via the radio path. The four least significant bits of the radio identity code are indicated by the record as has been described earlier.

Normally (that is to say for the network-internal traffic), only the serial number is transmitted. The network identifier is only transmitted when the paging call is intended for a receiver which visits an area.

The format of the address field is shown in FIG. 9. The subaddress informs the receiver where the message concerned is transmitted or how it is identified. According to the present invention, there are three different possibilities.

a) The whole subaddress is repeated in the message concerned.

b) The subaddress specifies where in the order of messages the message concerned is transmitted, that is to say the number of the message. If, for example, the value of the subaddress is 3, the message will be the third message transmitted in the message part of this record.

c) The subaddress specifies the position of the message concerned, that is to say a relative address at the beginning of the message.

It is possible to combine the method a with the methods b or c.

If a respective receiver is not addressed in the address part, it will enter into a battery-saving idle mode. If a pager has not found its message before the end of the record, the message is lost. This is the case for individual calls but not for sequential group calls.

To separate sequential group calls from individual calls, the subaddresses bits 60–64 are reserved for sequential group calls. A pager which receives a sequential group call will stay on that channel over several records until the message is received or until the end of the subsequence. This is based on the fact that sequential group calls can be addressed to receivers which belong to different records.

Traffic to visiting receivers is marked with external set to 1. These receivers are addressed with the whole radio identity code, that is to say both the network identifier and the serial number. The network identifier is transferred in the message field (see below).

The last paging call in the record is specified by the address end bit (ASB) being set to 1. Another variant of the invention is that a special address can be provided which indicates the end of the address part.

The message part contains the messages themselves. Only pagers which have been addressed listen and decode to this part. The message part consists of a number of message fields which correspond to address fields.

A message field consists of a section which is shown in FIG. 10 and a transparent part. The section contains a flag, the subaddress, the message number and fields which specify the application of special services (repetition, forwarding and urgent calls). After that begins the transparent part which transfers the message itself. The total length of the section is 26 bits for internal calls and 39 bits for external calls. The section is followed by the transparent part which continues until the next flag is transmitted on the radio path. To avoid that the flag appears in the message, bit stuffing is used.

The three protocol bits tell the receiver which protocol is used according to the table below.

| Message Type | Protocol bits |
| --- | --- |
| Numeric | 000 |
| Alphanumeric | 001 |
| Data | 010 |
| Forwarding of the last message number | 011 |
| Remote programming of further identity codes | 100 |
| Undefined | 101–111 |

A link bit is used when a message is very long. When the link bit is set to 1, this means that the message will be linked together with the next message which is transmitted to the receiver. This function is used when the calling party has sent a message which exceeds the maximum length allowed on the radio path. The network then divides the message into several parts which are transmitted in different records. The link bit enables the receiver to set the same message again.

The maximum number of bits in one message is shown below. The maximum number of bits does not include the section.

| Message Type | Maximum Length |
| --- | --- |
| Numeric message | 100 bits |
| Alphanumeric message | 3000 bits |
| Transparent data | 4100 bits |

Linking of messages can only be used for alphanumeric messages and transparent data messages. For all other types of message, the link bit is set to 0. A pager which receives a message which appears to be longer than the maximum length according to the above table produces the end record that the transmission has not been successful.

Transmission of a message which covers two records is interrupted by a synchronisation part, a system information part and an address part in the second record. The transmission of the message will be completed directly after the first part. Only alphanumeric and transparent data messages can be divided into two records in this manner. It is also possible to use the link bit for messages of greater length.

According to a preferred embodiment, the pager will be able to handle eight alarm signals specified by the alarm field. A tone call is specified by the tone bit being set to 1. For a tone-only call within the network, no subaddressing is used. This is the only case where subaddressing is not used. FIG. 11 shows how tone-only calling is handled. The first portion of FIG. 11 shows the data format for an internal tone only call with the bottom two portions showing the data format for an external tone only call.

The functions described below are initiated by the network operator or automatically by the network itself. These functions use the protocol bits in the message section. Automatic forwarding of the last message number gives the receiver the possibility to detect a loss of a message by comparing the last received message number with the stored number for the last correctly received message. Forwarding of the last message number is assumed to take up space in low traffic. Forwarding of the last message number only uses the section normally used for the message part. The transparent part is excluded. The message number field in the section contains the last message number as is shown in FIG. 12.

The service of remote programming of the radio identity code provides the network operator with the possibility of programming new radio identity codes from a remote terminal via the radio path. The new radio identity codes are over and above the basic radio identity code of the receivers. FIG. 13 shows the foremost of how this type of message might be transmitted. To ensure a reliable transmission of the new (extra radio identity code), the new radio identity code is transmitted three times and contains both the network identifier and the serial number. If there is a lack of correspondence between the received radio identity codes, a majority decision method may be used.

The method according to the invention thus provides a way of transmitting messages which involves battery saving by the fact that receivers which are not addressed in the address part do not listen to the message part but go into a battery-saving idle mode. Other embodiments than that described above in detail are naturally possible which is obvious to an expert in the field. The invention is only limited by the patent claims below.

We claim:

1. A method of communicating paging information, comprising the steps of:

transmitting information using a format layer, a channel coding layer, and a modulation layer, the format layer including a plurality of records, one of said plurality of records assigned to a predetermined paging receiver;

monitoring, by the predetermined paging receiver, a home channel, and when the home channel is detected, monitoring only said one of said plurality of records, and when others of said plurality of records exist, idling the predetermined paging receiver in order to save power; and monitoring, by the predetermined paging receiver, a plurality of channels, when the home channel is not detected, wherein the transmitting step includes transmitting the format layer to include:
a sequence including a plurality of cycles, the predetermined paging receiver being active in only one of the cycles;
a plurality of subsequences in each of the cycles, the subsequences for time dividing transmissions between neighboring paging networks, each of the plurality of subsequences having a corresponding plurality of records, one of which is said plurality of records.

2. A method according to claim 1, wherein said step of monitoring the plurality of channels includes:

monitoring a plurality of records within each of the plurality of channels in order to determine a record assigned to the predetermined paging receiver.

3. A method according to claim 1, wherein:

the predetermined paging receiver is assigned a home network and said step of monitoring the home channel and idling are performed when the predetermined paging receiver is in the home network thereof; and said step of monitoring the plurality of channels is performed when the predetermined paging receiver is outside of the home network thereof.

4. A system for communicating paging information, comprising:

a paging receiver; and a transmitter for transmitting information using a format layer, a channel coding layer, and a modulation layer, the format layer including a plurality of records, one of the records assigned to the paging receiver, wherein the paging receiver includes:

means for monitoring a home channel, and when the home channel is detected, monitoring only said one of said one of said plurality of records, and when others of said plurality of records exist, idling the paging receiver in order to save power; and means for monitoring a plurality of channels, when the home channel is not detected, wherein the transmitter transmits the format layer to include:

a sequence including a plurality of cycles, the predetermined paging receiver being active in only one of the cycles; and a plurality of subsequences in each of the cycles, the subsequences for time dividing transmissions between neighboring paging networks, each of the plurality of subsequences having a corresponding plurality of records, one of which is said plurality of records.

5. A system according to claim 4, wherein the means for monitoring the plurality of channels includes:

means for monitoring a plurality of records within each of said one of said plurality of channels in order to determine a record assigned to the predetermined paging device.

6. A system according to claim 4, wherein:

the predetermined paging device is assigned a home network and said means for monitoring the home channel and idling operate when the predetermined paging device is in the home network thereof; and said means for monitoring the plurality of channels operates when the predetermined paging device is outside of the home network thereof.

* * * * *